United States Patent [19]

Sessler

[11] 4,221,959
[45] Sep. 9, 1980

[54] CHECKING DEVICE FOR CHECKING THE FOOD INTAKE

[76] Inventor: Eva-Maria Sessler, Dachauerstrasse 33, 8061 Unterbachern, Fed. Rep. of Germany

[21] Appl. No.: 882,123

[22] Filed: Feb. 28, 1978

[30] Foreign Application Priority Data

Mar. 2, 1977 [DE] Fed. Rep. of Germany ....... 2709081

[51] Int. Cl.² ............................................. G06M 1/02
[52] U.S. Cl. ............................ 235/92 AC; 235/92 CP
[58] Field of Search ......... 235/92 PE, 92 CP, 92 AC; 364/413, 705; 58/152 R; 283/2-3, 44, 65

[56] References Cited

U.S. PATENT DOCUMENTS

| 2,588,795 | 3/1952 | Bauer | 283/2 |
| 3,777,475 | 12/1973 | Grossan | 58/152 R |
| 3,834,153 | 9/1974 | Yoda et al. | 58/38 |
| 4,070,649 | 1/1978 | Wright et al. | 235/92 CP |
| 4,100,401 | 7/1978 | Tutt et al. | 235/92 T |
| 4,101,071 | 7/1978 | Brejnik | 235/92 TF |

Primary Examiner—Joseph M. Thesz
Attorney, Agent, or Firm—Ostrolenk, Faber, Gerb & Soffen

[57] ABSTRACT

An apparatus for checking food intake, which advises user of amount of a particular food or constituent thereof which may still be eaten during remainder of measuring period, including a counter and a register.

3 Claims, 4 Drawing Figures

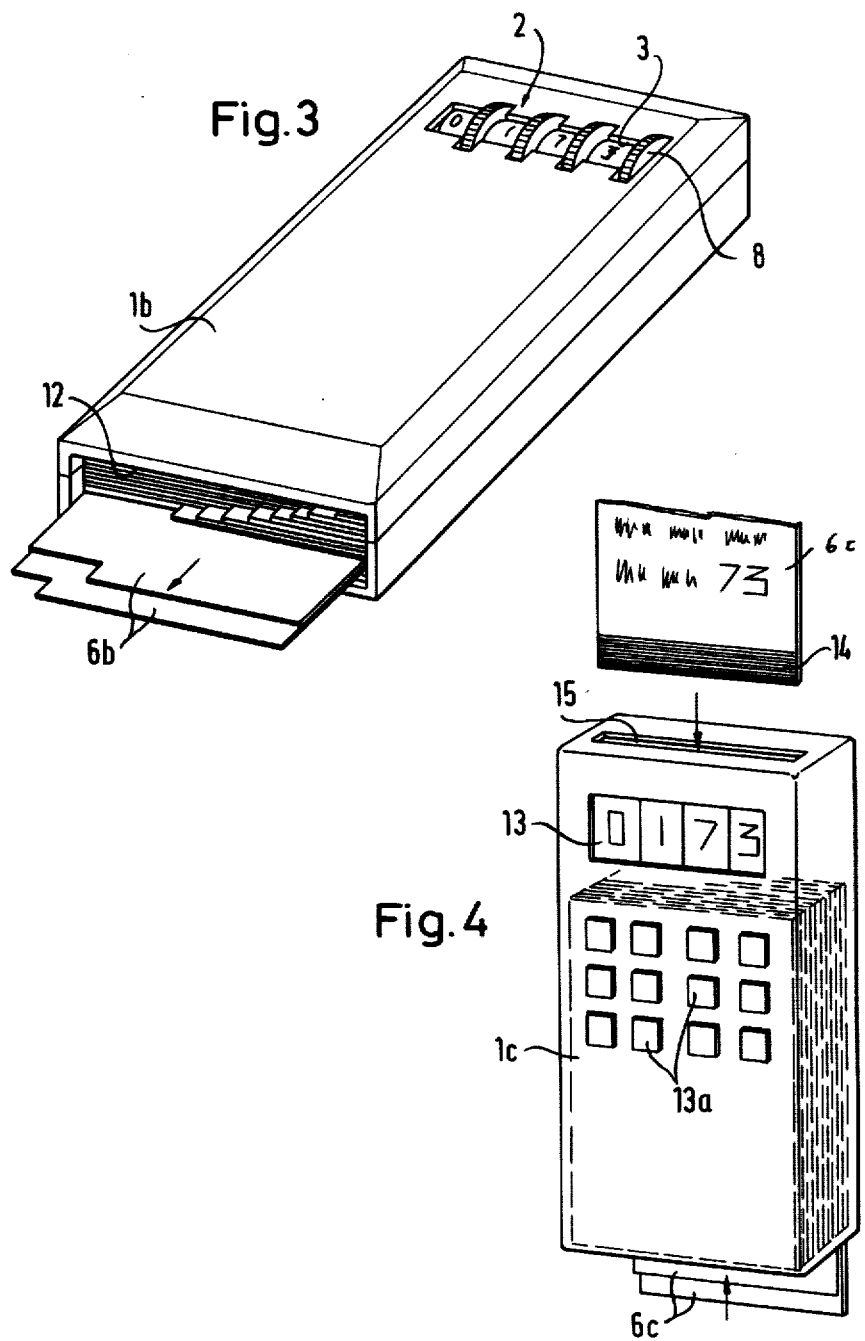

CHECKING DEVICE FOR CHECKING THE FOOD INTAKE

The invention relates to a checking device for checking the food intake.

For many persons it is important for a variety of reasons to know exactly the amount of food taken in over a predetermined period. Thus, for example, for persons who are overweight it is desirable to have a picture of the amount of food taken in in the course of a day, in particular as regards its calorie content, and it is important for diabetics to know the exact number of bread units in the food taken in in the course of a day.

The invention is based on the problem of providing a checking means of the kind mentioned at the beginning which at any time provides a general picture of the permitted or intended amount of food already taken in or to be taken in or of a predetermined constituent or a property of said food.

According to the invention, proceeding from a checking device of the type mentioned at the beginning this problem is solved in that the checking device comprises a housing in which a counter and a register with data on the food or the predetermined constituent or the property of said food are disposed.

According to a further development of the invention the register is constructed in the form of stiff sheets which are pivotal about an axis out of the housing and provided with a corresponding data inscription.

According to a further development of the invention the register is constructed as a strip which is adapted to be spooled forwardly and rearwardly with the aid of at least two rollers and is provided with corresponding data inscription, and in an outer surface of the housing a window is formed through which predetermined sections of the strip are visible.

According to a further development of the invention, in the housing a reception compartment is provided for the individual cards carrying the data.

The counter may be constructed in simple manner as multidigit counter which can be adjusted and advanced by hand.

According to a further development of the invention the counter is an electronic counter with an electronic display. This counter may be controlled by a store in which values to be derived corresponding to the cards may be manually fed.

According to a further advantageous development of the invention the register is formed by cards which have a magnetic coating or other data recording on which the data to be registered are magnetically or otherwise recorded and the feeding into the store of the electronic counter is effected via a corresponding magnetic, optical or mechanical scanning means.

According to a further advantageous development of the invention the stiff sheets or cards of the register are in various colours and/or provided with a finger register to make the desired date easier to find.

The invention will be explained hereinafter in detail with reference to the examples of embodiment illustrated in the drawings, wherein:

FIG. 3 shows a further embodiment of the checking device with cards adapted to be inserted into a compartment in the housing;

FIG. 4 shows a further embodiment of the checking device comprising an electronic display and a scanning means for magnetic cards.

Figure 1:
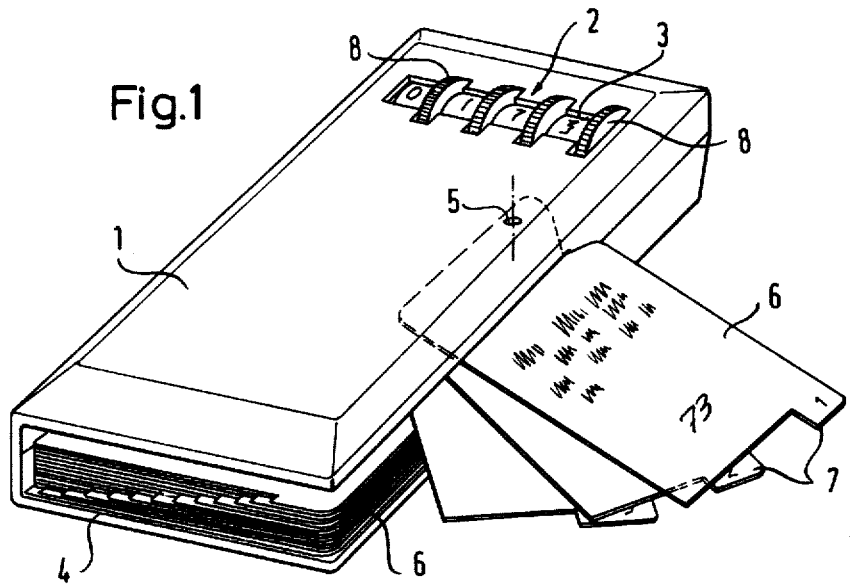
FIG. 1 shows an embodiment of the checking device with a register formed by cards adapted to be pivoted out.

The embodiment of the checking device illustrated in FIG. 1 comprises a housing 1 in one end of which a multidigit counter 2 is disposed behind a window 3. The narrow side 4 opposite the counter and an edge face of the housing 1 is provided with an opening to form a receiving compartment open at two sides. A pivot pin 5 is disposed perpendicularly to the lower and upper surfaces of the housing 2 in the vicinity of the open edge face. Pivotally mounted on said pivot pin is a plurality of cards 6. These cards may be provided with any desired data inscriptions, for example nature of the food, proportion of the constituents essential for any particular purpose, amount of said constituents, nature of the preparation of the food and permissible amount for example per day. These data may for example in particular include the calorie content and the number of bread units and carbohydrates. The cards 6 may be provided at their free end with a finger register 7 which may bear an alphabetical or numerical inscription to make the respective foods easier to find. Further cards may be imprinted with ideal weight tables, diet instructions and the like. Finally, a magnifying glass may be pivotally mounted on the shaft 5 above the uppermost card. The counter may be constructed as simple counter adjustable via finger wheels 8, a mechanical detent preferably being provided to prevent unintentional rotation of the counter rollers. The counter may advance automatically or be simply an aid to memory.

Figure 2:
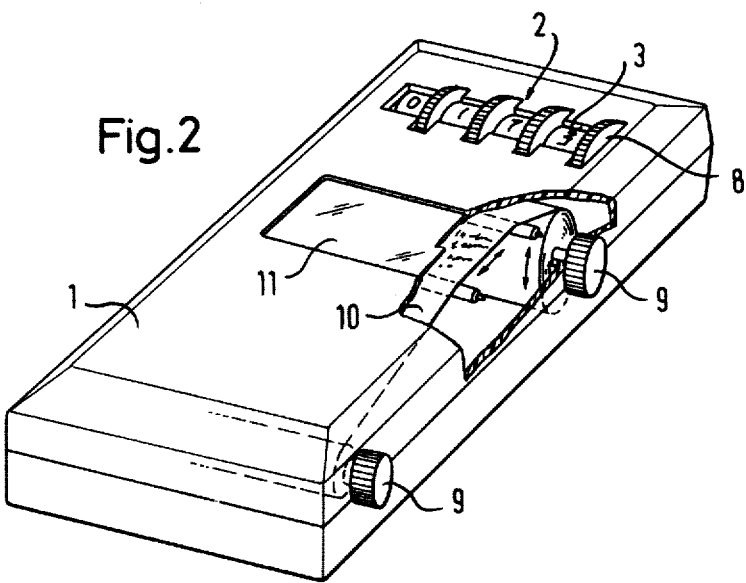
FIG. 2 shows a further embodiment of the checking device comprising a register formed by a reversibly spoolable strip.

The embodiment of the checking device illustrated in FIG. 2 differs from that shown in FIG. 1 in a different form of the register which in the embodiment illustrated is formed by a strip 10 wound on rollers actuable with the aid of two control knobs 9, a desired portion of the strip being visible through a window 11 in the upper housing half. By spooling with the aid of the control knobs 9 a desired portion of the strip can be made visible in the window 11 and read off. In this case as well, the window 11 is covered by a magnifying glass (not shown) to make the data on the strip easier to read.

A further embodiment of the checking device is shown in FIG. 3. In this embodiment only a narrow side of the housing 1b is provided with an opening which merges into a receiving compartment 12 for cards 6b. These cards are also provided with a finger register to make the desired data easier to find. Of course, the cards may also be made different in colour to make the desired information even easier to find.

FIG. 4 shows a further embodiment of the checking device which comprises a housing 1c in which an electronic counter and display unit 13 is disposed. As shown, this housing 1c also comprises a receiving compartment for cards 6c which are provided at one or more edges with magnetically, optically or mechanically readable data recordings 14. These data recordings may be formed by a magnetic inscription, by perforations or by other means which permit the mechanical, optical or magnetic scanning of the respective cards by scanning means disposed in the housing behind a slot 15. Additionally, feed-in means may be provided in the form of keys 13a on the top of the housing 1c to permit the feeding-in of data on the amount of food.

These keys 13a may also be employed instead of the scannable data recording on the cards 6c for feeding the data derivable from the cards into the display and counter unit 13, and further may be used for controlling calculations like these, which are possible with usual pocket calculators, if the display and counter unit 13 is provided with means known per se to perform calculations as well.

The construction of the checking device according to the invention permits a simple association of the data carried on the cards and a recording and registering of the constituents of these foods absorbed during a day or during a different period of time and the data to be fed into the counter can be taken from the cards.

I claim:

1. A checking device for checking food intake, comprising a housing; an electronic counter disposed in the housing and including an electronic display visible outside of the housing for displaying data with respect to food or with respect to a predetermined constituent or property of food; a register disposed in the housing; said register being comprised of a plurality of stiff sheets; a pivot support in said housing for said stiff sheets; said housing being open at at least one side thereof for enabling said stiff sheets to be pivoted about said pivot support out of said housing through said opening therethrough; each said stiff sheet being independently pivotally supported on said pivot axis; each said stiff sheet being provided with data related to food or to a predetermined constituent or property of food.

2. The checking device of claim 1, wherein said counter communicates with a store located in said housing, for storing information; said housing having a keyboard thereon and said keyboard communicating with said store for feeding into said store data derivable from said sheets.

3. The checking device of claim 2, further comprising additional calculator means being provided in said housing for enabling additional calculations beyond calculations relating to food intake to be performed.

* * * * *